United States Patent [19]

Wilkinson et al.

[11] 4,381,519

[45] Apr. 26, 1983

[54] ERROR CONCEALMENT IN DIGITAL TELEVISION SIGNALS

[75] Inventors: James H. Wilkinson; Mark C. Collins, both of Tadley, Near Basingstoke, England

[73] Assignee: Sony Corporation, Tokyo, Japan

[21] Appl. No.: 302,153

[22] Filed: Sep. 14, 1981

[30] Foreign Application Priority Data

Sep. 18, 1980 [GB] United Kingdom ................. 8030149

[51] Int. Cl.³ ...................... H04N 9/535; H04N 9/491
[52] U.S. Cl. .................................. 358/21 R; 358/314
[58] Field of Search ............... 358/21 R, 160, 36, 167, 358/314, 336; 360/38.1; 364/515

[56] References Cited

U.S. PATENT DOCUMENTS 4,323,916  4/1982  Dischert et al. ...................... 358/13

FOREIGN PATENT DOCUMENTS 2070884  9/1981  United Kingdom ................ 358/314

*Primary Examiner*—John C. Martin

*Attorney, Agent, or Firm*—Lewis H. Eslinger; Alvin Sinderbrand

[57] ABSTRACT

A method of concealing errors in a composite PAL or NTSC digital television signal formed of sample signals corresponding respectively to sample positions along horizontal scan lines of a television picture made up of a plurality of such horizontal lines, comprises, in respect of each sample signal the steps of, using a first algorithm to calculate a first expected value of the sample signal, the first algorithm using actual values of adjacent sample signals in the same horizontal line as the sample signal, using a second algorithm to calculate a second expected value of the sample signal, the second algorithm using actual values of adjacent sample signals in the same horizontal line as the sample signal and actual values of adjacent sample signals in the horizontal lines preceding and following the horizontal line of the sample signal, continuously monitoring which of the first and second algorithms gives expected values closer to the actual values, and on occurrence of an error sample signal using the algorithm currently giving the better result to calculate a corrected sample signal to be substituted for the error sample signal.

7 Claims, 9 Drawing Figures

ERROR CONCEALMENT IN DIGITAL TELEVISION SIGNALS

BACKGROUND OF THE INVENTION

1. Field of the Invention

This invention relates to error concealment in digital television signals, and more particularly in composite PAL or NTSC digital television signals.

2. Description of the Prior Art

Recently there has been an increasing interest in the use of digital techniques for television signals. Such techniques are, for example, used in some video tape recording arrangements where an incoming television signal to be recorded is sampled, the samples are coded into digital form, the digital data signals are recorded and subsequently reproduced by a video tape recorder (VTR), the reproduced digital data signals are decoded, and the decoded signals are used to form an analog signal corresponding to the original television signal.

If errors occur in the handling of the digital signals, for example due to noise or drop-out occurring in the VTR, the digital signals are corrupted and then the reformed television signal does not correspond exactly to the original television signal, and a resulting television picture is degraded.

There are two main approaches to dealing with errors in digital television signals. The first approach is correction, which involves the production and use of additional data signals purely for the purposes of error detection and correction, these additional data signals otherwise being redundant. While correction provides good results, it cannot generally be used as the sole means of dealing with errors, because a comprehensive correction capability would require an excessive amount of additional data which might overload the data handling paths or raise the data rate to an unacceptable level. The second approach, with which the present invention is more particularly concerned, is concealment. This comprises the replacement of corrupted data signals by data signals generated using available uncorrupted data signals. This method relies largely for accuracy on the strong correlation that exists in a television signal.

SUMMARY OF THE INVENTION

One object of the present invention is to provide an improved method and apparatus for concealing errors in digital television signals.

Another object of the present invention is to provide a method and apparatus for concealing errors in digital television signals using selection of one correction algorithm from two correction algorithms.

Another object of the present invention is to provide a method and apparatus for concealing errors in digital television signals using sample values which are adjacent to an error sample value.

According to the present invention there is provided a method of concealing errors in a composite PAL or NTSC digital television signal, which television signal comprises a plurality of sample signals corresponding respectively to sample positions along a horizontal scan line of a television picture made up of a plurality of said horizontal lines, the method comprising, in respect of each said sample signal:

using a first algorithm to calculate a first expected value of said sample signal, said first algorithm using actual values of adjacent sample signals in the same horizontal line as said sample signal for said calculation;

performing a first comparison between said first expected value and the actual value of said sample signal;

using a second algorithm to calculate a second expected value of said sample signal, said second algorithm using actual values of adjacent sample signals in the same horizontal line as said sample signal and actual values of adjacent sample signals in the horizontal lines preceding and following the horizontal line of said sample signal;

performing a second comparison between said second expected value and the actual value of said sample signal;

continuously storing an indication as to which of said first and second comparisons gives the closer result; and on occurrence of an error sample signal substituting a corrected sample signal for said error sample signal so as to conceal the error, said corrected sample signal being generated using said first or second algorithm in dependence on said indication.

According to the present invention there is also provided apparatus for concealing errors in a composite PAL or NTSC digital television signal, which television signal comprises a plurality of sample signals corresponding respectively to sample positions along a horizontal scan line of a television picture made up of a plurality of such lines, the apparatus comprising:

means operative in respect of each said sample signal to use a first algorithm to calculate a first expected value of said sample signal, said first algorithm using actual values of adjacent sample signals in the same horizontal line as said sample signal for said calculation;

means for performing a first comparison between said first expected value and the actual value of said sample signal;

means operative in respect of each said sample value to use a second algorithm to calculate a second expected value of said sample signal, said second algorithm using actual values of adjacent sample signals in the same horizontal line as said sample signal and actual values of adjacent sample signals in the horizontal lines preceding and following the horizontal line of said sample signal;

means for performing a second comparison between said second expected value and the actual value of said sample signal;

means for continuously storing an indication as to which of said first and second comparisons gives the closer result; and means operative on occurrence of an error sample signal to substitute a corrected sample signal for said error sample signal so as to conceal the error, said corrected sample signal being generated using said first or second algorithm in dependence on said indication.

The above, and other objects, features and advantages of the invention will be apparent from the following detailed description of illustrative embodiments which is to be read in connection with the accompanying drawings.

DESCRIPTION OF THE PREFERRED EMBODIMENTS

The method and apparatus to be described are for error concealment in a composite PAL or NTSC digital television signal. Consideration will first be given to a PAL signal, and the modifications for an NTSC signal will then be considered. The sampling frequency used to sample the analog PAL television signal is approximately 8.8 Megahertz, and as this is twice the color sub-carrier frequency of the television signal the resulting data is sometimes referred to as $2f_{sc}$ data. At this sampling frequency the Nyquist frequency is approximately 4.4 Megahertz which is below the maximum frequency of 5.5 Megahertz to be sampled, so the system is sub-Nyquist and in theory frequencies above approximately 4.4 Megahertz cannot be reproduced. In practice, however, by use of suitable two-dimension filtering higher frequencies can be reproduced. This is explained in more detail in IBA Technical Review, No. 12, pp 3 to 15.

Figure 1:
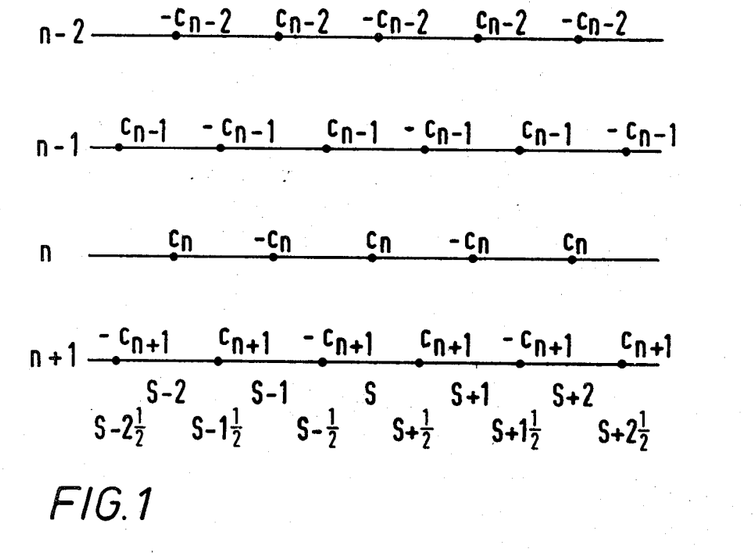
FIGS. 1 to 4 show respective parts of a matrix of sample positions in one field of a composite PAL digital television signal.

Referring to FIG. 1 this shows part of a matrix of sample positions in one field of a television picture, four consecutive horizontal scan lines of the picture being shown. The sample positions are disposed at regular intervals along each of the lines, the intervals corresponding to the sampling frequency of approximately 8.8 Megahertz, and the sample positions in alternate lines are aligned in the vertical direction. In adjacent lines the sample positions are off-set by half the interval, so that viewed in the vertical direction the sample positions in one line fall mid-way between the sample positions in the lines immediately above and below. Thus the overall pattern is diagonal rather than orthogonal.

Moreover, if the chrominance component of each sample is taken as c, then the actual samples alternate c, $-c$, c, $-c$, ... in, for example, even-numbered lines. In the odd-numbered lines also the samples alternate in sign, and are in fact jc, $-jc$, jc, $-jc$, ... For convenience, and for ready comparison with the NTSC sample matrices described below, the samples are designated $c_n$, $-c_n$, ... $c_{n+1}$, $-c_{n+1}$, ... etc., the suffices corresponding to the line numbers, in FIGS. 1, 3 and 4. Due to the PAL quarter-line off-set the positive and negative samples in the even-numbered lines and in the odd-numbered lines also alternate in the vertical direction, so the pattern indicated in FIG. 1 repeats at four line intervals. The PAL 25 Hertz off-set results in only a small error in embodiments of the invention and will therefore be ignored.

Reading from the top, consecutive lines are denoted $n-2$, $n-1$, n, $n+1$, ..., and reading from the left consecutive sample positions in the odd-numbered lines are denoted ... $S-2$, $S-1$, S, $S+1$, $S+2$, ... and in the odd-numbered lines are denoted ... $S-2\frac{1}{2}$, $S-1\frac{1}{2}$, $S-\frac{1}{2}$, $S+\frac{1}{2}$, $S+1\frac{1}{2}$, $S+2\frac{1}{2}$, ... Using this notation, any sample position in the matrix can be designated by the line and sample nunber, so sample position n, S is in line n at position S.

The concealment method operates using two algorithms each of which is used continuously to calculate expected sample values at each sample position from the known sample values at near-by sample positions. Each expected value is then compared with the actual sample value at that position and an indication of which algorithm is producing expected values closer to the actual values at any time is stored. Then, on occurrence of an error sample, the algorithm currently giving the closer values is used to calculate a corrected sample value which is then substituted in place of the error sample.

The fact that there is an error at a given position can be determined in any suitable manner, and the manner used is not of critical importance to the concealment method now being described. Briefly, however, and purely by way of example, it may be determined that the data word representing the sample value is not valid. As a more specific example, suppose that each sample value is coded into a word in the sub-set of 10-bit words which consist of some combination of five "0" bits and five "1" bits; this being convenient for magnetic recording and reproduction because of the large number of transients and the ease of clock recovery. In this case any reproduced data word not having five "0" bits and five "1" bits is not a valid member of the sub-set and so is clearly an error. Thereupon a flag signal indicating an error sample is generated.

The two algorithms used will now be described, and they will be designated as algorithms A1 and A2.

The first algorithm A1 uses a simple averaging technique whereby the expected sample value at a given sample position is calculated by averaging the actual sample values at the next-but-one sample positions before and after the given sample position in the same horizontal line. The next-but-one sample positions are used, rather than the immediately adjacent ones, partly to reduce the chance of the sample values used for the algorithm also themselves being in error, but also to avoid problems resulting from the alternating signs of the chrominance component.

If then A1V is an expected sample value calculated using the algorithm A1 and AV is an actual sample value, then the algorithm A1 may be represented as:

$$A1V(n, S) = \tfrac{1}{2}AV(n, S - 2) + \tfrac{1}{2}AV(n, S + 2)$$

Figure 2:
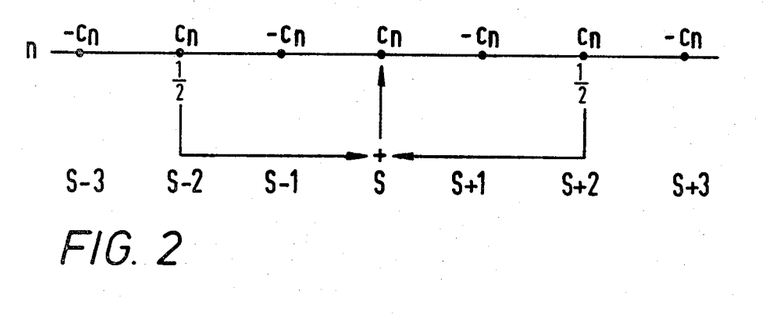
Figure 3:
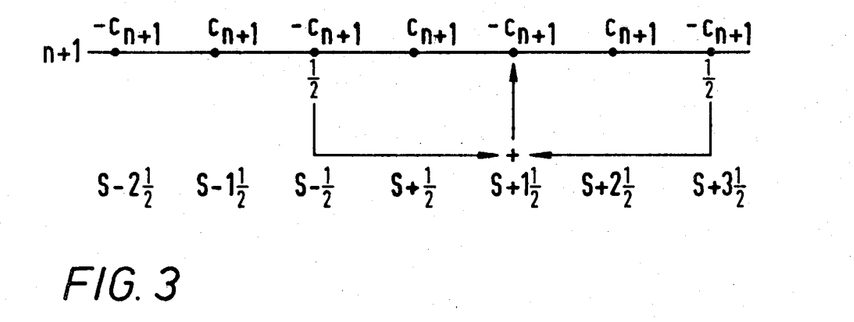

This is also illustrated in FIG. 2 from which it will be seen that the algorithm A1 will continue to produce appropriate expected sample values as the sample position for which the calculation is being performed steps along the horizontal line n. Reference to FIG. 3 will show that this is also true of the odd-numbered lines. In other words the algorithm A1 is independent of the values of n and S.

The algorithm A1 has very good vertical resolution, but the horizontal resolution is relatively poor and indeed it can be shown that there are circumstances where concealment based exclusively on the algorithm A1 produces worse results in a television picture than no concealment at all.

It will be noted that the algorithm A1 is a one-dimensional algorithm, as it uses sample values from a single horizontal line. The algorithm A2, on the other hand, uses sample values from three consecutive horizontal lines and has good horizontal resolution. The sample values used are those at the eight sample positions nearest to the given sample position and a summation is used which takes into account the signs of the sample values. Using the same notation as before, the algorithm A2 may be represented as:

$$A2V(n, S) = \tfrac{1}{8}AV(n-1, S-\tfrac{1}{2}) + \tfrac{1}{8}AV(n-1, S+\tfrac{1}{2}) + \tfrac{1}{8}AV(n, S-2) - \tfrac{1}{4}AV(n, S-1) - \tfrac{1}{4}AV(n, S+1) + \tfrac{1}{8}AV(n, S+2) + \tfrac{1}{8}AV(n+1, S-\tfrac{1}{2}) + \tfrac{1}{8}AV(n+1, S+\tfrac{1}{2})$$

Figure 4:
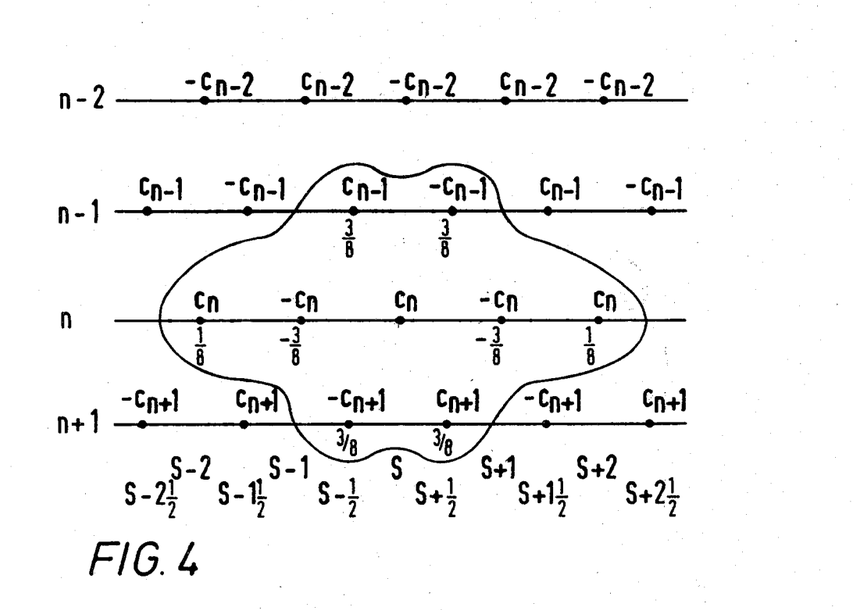

This is also illustrated in FIG. 4 from which it will be seen that in the particular example shown therein, and due to the signs of the sample values and the signs used in the algorithm A2, the algorithm A2 sums to "$c_n$." Likewise when the next sample position $S+1$ to the right in the same horizontal line n is considered, it sums to "$-c_n$". Likewise for the sample position $n+1$, $S+\tfrac{1}{2}$, for example, it sums to "$c_{n+1}$" as required. In other words the algorithm A2 is also independent of the values of n and S.

Although in describing the algorithms A1 and A2 particular consideration has been given to the chrominance components, it will be apparent from the fact that in both the algorithms A1 and A2 the coefficients sum to unity, that they are also appropriate for luminance components. Thus for a flat grey field, for example, it will be seen that the algorithms A1 and A2 will give correct values for A1V and A2V respectively.

Figure 5:
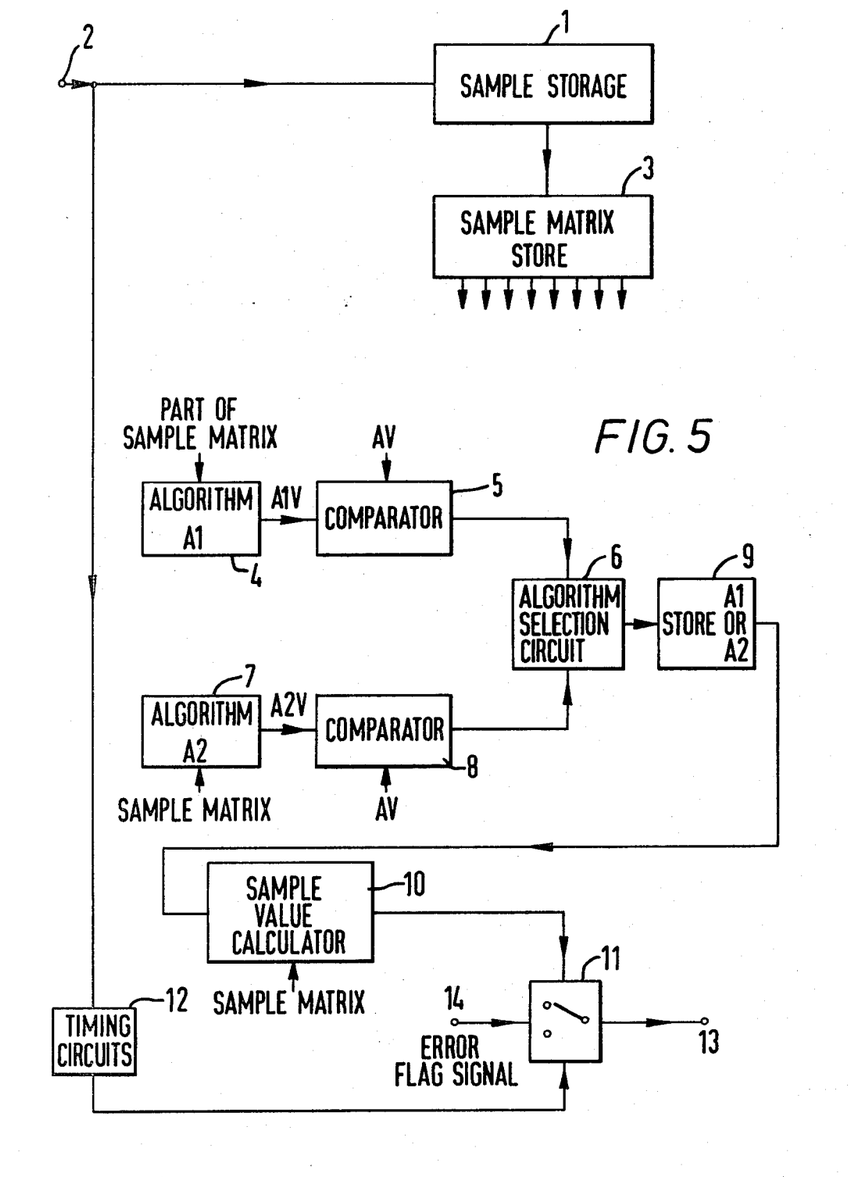
FIG. 5 shows in block form an embodiment of apparatus for concealing errors in a composite PAL or NTSC digital television signal and according to the invention.

Referring to FIG. 5, this shows apparatus for concealing errors in a PAL digital television signal. The apparatus comprises a sample storage means 1 to which input samples which may, for example, have been reproduced from a digital VTR are supplied by way of an input terminal 2. The sample storage means 1 supplies outputs to a sample matrix storage means 3 which stores a moving matrix of sample values corresponding to the sample positions $n-1$, $S-\tfrac{1}{2}$; $n-1$, $S+\tfrac{1}{2}$, n, $S-2$; n, $S-1$; n, S; n, $S+1$; n, $S+2$; $n+1$, $S-\tfrac{1}{2}$; and $n+1$, $S+\tfrac{1}{2}$.

Part of the output of the sample matrix storage means 3 is supplied to an A1 algorithm calculation circuit 4 which for each sample position calculates the expected sample value A1V and supplies it to a comparison circuit 4 where it is compared with the actual value AV. This comparison results in an error signal, the magnitude of which represents the error between the estimated sample value A1V and the actual sample value AV, this error signal being supplied to an algorithm selection circuit 6.

The output of the sample matrix storage means 3 is supplied to an A2 algorithm calculation circuit 7 which for each sample position calculates the expected sample value A2V and supplies it to a comparison circuit 8 where it is compared with the actual sample value AV. This comparison results in a further error signal, the magnitude of which represents the error between the estimated sample value A2V and the actual sample value AV, this further error signal also being supplied to the algorithm selection circuit 6.

On the basis of the magnitudes of the error signals supplied to it, the algorithm selection circuit 6 selects the algorithm A1 or A2 which at that given moment is resulting in more accurate estimated sample values, and an indication of the algorithm A1 or A2 so selected is stored in a storage means 9.

The indication stored in the storage means 9 is supplied to a sample value calculator 10 to which the output of the sample matrix storage means 3 is also supplied, the sample value calculator 10 calculating an estimated sample value A1V or A2V in dependence on the algorithm A1 or A2 currently indicated in the storage means 9. This estimated sample value A1V or A2V is supplied to a switching circuit 11. The input samples supplied to the input terminal 2 are also supplied by way of timing circuits 12 to the switching circuit 11.

Normally, the input samples supplied from the input terminal 2 by way of the timing circuits 12 will be supplied by the switching circuit 11 to an output terminal 13. However, on the occurrence of an error an error flag signal is supplied to a terminal 14 connected to the switching circuit 11 and causes the switching circuit 11 to switch so as to substitute the estimated sample value A1V or A2V for the error sample value in the sample values supplied to the output terminal 13.

Various refinements and extensions of the method and apparatus are of course possible. For example, in the above description it has been assumed that the algorithm A1 or A2 is selected by a simple comparison of the accuracy of the estimated sample values A1V and A2V with the actual sample value AV. In certain circumstances, however, it may be expected that one or other of the algorithms A1 or A2 will give a more accurate result, and in this case rather than a simple comparison, some weighting of one or other of the algorithms A1 or A2 may be introduced.

It will be understood that the timing circuits 12 operate so that the estimated sample value A1V or A2V which is used will normally be one based on the last available sample values prior to the sample value which is in error. However, at any given time at least one complete field of sample values is available for signal processing, and it is not therefore essential to use an estimated sample value A1V or A2V based on actual sample values preceding the sample value which is in error, as an estimated sample value A1V or A2V based on actual sample values subsequent to the error sample value may alternatively, or in addition, be used.

The modifications necessary in the case of a composite NTSC digital television signal will now be considered. The sampling frequency used to sample the analog NTSC television signal is approximately 7.2 Megahertz, the actual frequency being twice the color sub-carrier frequency $f'_{sc}$ of the television signal, minus or plus one quarter of the line scan frequency $f_H$. At this sampling frequency the Nyquist frequency is approximately 3.6 Megahertz which is below the maximum frequency of 4.5 Megahertz to be sampled, so again the system is sub-Nyquist and in theory frequencies above 3.6 Megahertz cannot be reproduced. This is explained in more detail in SMPTE Journal, January 1976, in an article "Sub-Nyquist encoding of PCM NTSC color television" by John Rossi.

Figure 6A:
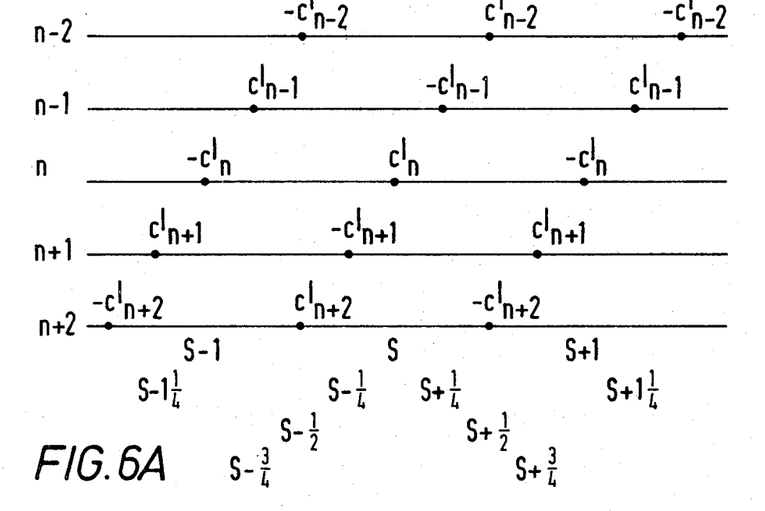
FIGS. 6A, 6B, 7A and 7B show respective parts of a matrix of sample positions in one field of a composite NTSC digital television signal.
Figure 6B:
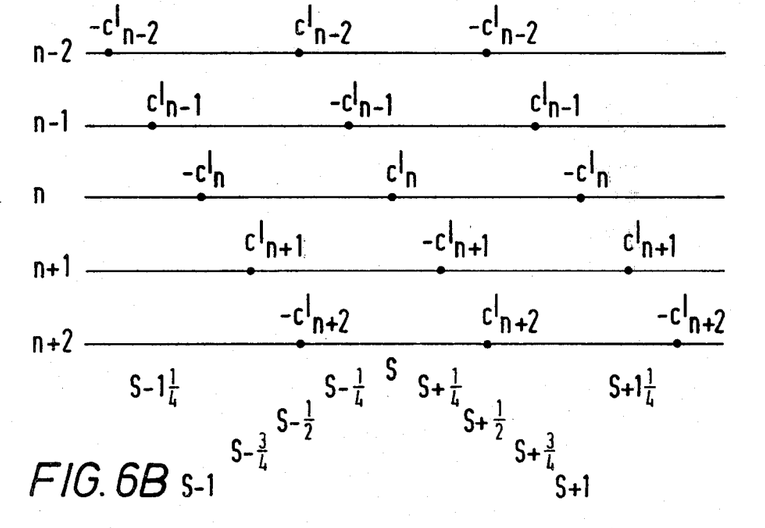

Referring to FIGS. 6A and 6B, these show parts of matrices of sample positions in one field of a television picture, five consecutive horizontal scan lines of the picture being shown, for sampling frequencies of $f'_{sc} - \tfrac{1}{4}f_H$ and $f'_{sc} + \tfrac{1}{4}f_H$ respectively. The sample positions are disposed at regular intervals along each of the lines, the intervals corresponding to the sampling frequency of approximately 7.2 Megahertz, and the sample positions in every fourth line are aligned in the vertical direction. In adjacent lines the sample positions are off-set by one quarter of the interval. Thus again the overall pattern is diagonal rather than orthogonal.

Moreover, as with a PAL signal, if the chrominance component of each sample is taken as c, then the actual samples alternate c, $-c$, c, $-c$, . . . in say even-numbered lines. In the line n, for example, the samples are designated $c'_n$, $-c'_n$, $c'_n$, $-c'_n$, . . . In odd-numbered lines the samples again alternate in sign and are designated $c'_{n-1}$, $c'_{n-1}$, ... $c'_{n+1}$, $c'_{n+1}$, ... etc. As with the PAL sample matrix, the pattern repeats at four line intervals.

Reading from the top, consecutive lines are again denoted $n-2$, $n-1$, $n$, $n+1$, ..., and reading from the left consecutive sample positions in the line n are denoted ... $S-2$, $S-1$, $S$, $S+1$, $S+2$, ..., and similarly for the other lines as indicated, having in mind that in this case the off-set between adjacent lines is one quarter.

As for a PAL signal, two algorithms are used, and the first is the algorithm A1 described above.

The second algorithm takes one of two forms depending on the sampling frequency. For the sampling frequencies $f'_{sc} - \frac{1}{4}f_H$ and $f'_{sc} + \frac{1}{4}f_H$, the second algorithm is designated A'2 and A"2 respectively. In both cases the sample values used are those at eight near-by sample positions and a summation is used which takes into account the signs of the sample values. Using the same notation as before, the algorithm A'2 may be represented as:

$$A'2V(n, S) = \tfrac{1}{8}AV(n-1, S-\tfrac{3}{4}) + \tfrac{3}{8}AV(n-1, S+\tfrac{1}{4}) + \tfrac{1}{8}AV(n, S-2) - \tfrac{3}{8}AV(n, S-1) - \tfrac{3}{8}AV(n, S+1) + \tfrac{1}{8}AV(n, S+2) + \tfrac{3}{8}AV(n+1, S-\tfrac{1}{4}) + \tfrac{1}{8}AV(n+1, S+\tfrac{3}{4})$$

Figure 7A:
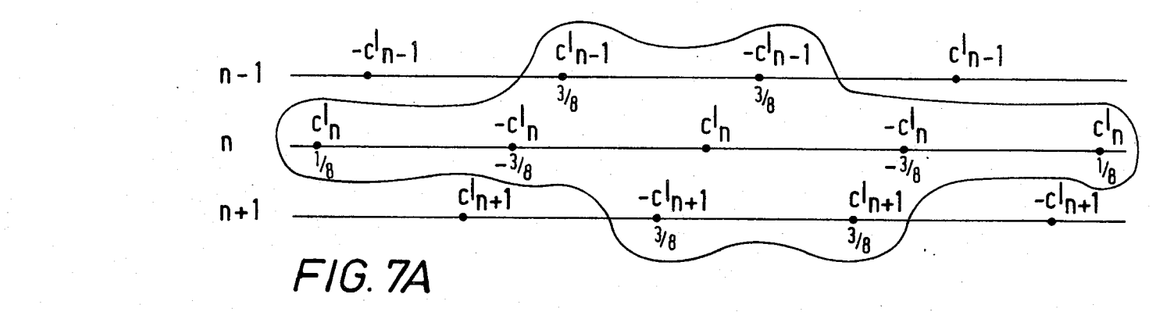
Figure 7B:
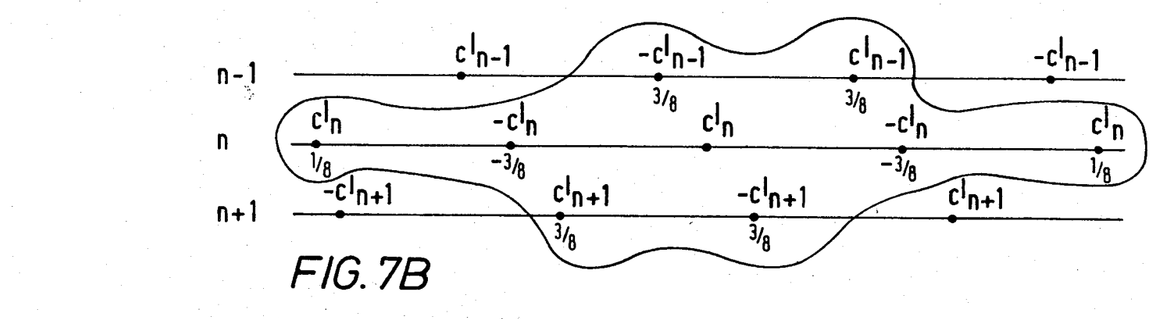

This is also illustrated in FIG. 7A, while FIG. 7B illustrates the algorithm A"2, which may be represented as:

$$A''2V(n, S) = \tfrac{3}{8}AV(n-1, S-\tfrac{1}{4}) + \tfrac{1}{8}AV(n-1, S+\tfrac{3}{4}) + \tfrac{1}{8}AV(n, S-2) - \tfrac{3}{8}AV(n, S-1) - \tfrac{3}{8}AV(n, S+1) + \tfrac{1}{8}AV(n, S+2) + \tfrac{1}{8}AV(n+1, S-\tfrac{3}{4}) + \tfrac{3}{8}AV(n+1, S+\tfrac{1}{4})$$

It will be apparent that the apparatus of FIG. 5 requires modification for an NTSC digital television signal. In particular, the moving matrix of sample values supplied by the sample storage means 1 is appropriately modified, and the algorithm calculation circuit 7 calculates the algorithm A'2 or A"2 as appropriate.

The invention is not limited to concealment of errors which have arisen in the course of recording and reproducing from a VTR, but may be used in any situation where errors have arisen in processing, transmitting or handling a composite PAL or NTSC digital television signal.

Although illustrative embodiments of the invention have been described in detail herein with reference to the accompanying drawings, it is to be understood that the invention is not limited to those precise embodiments, and that various changes and modifications can be effected therein by one skilled in the art without department from the scope and spirit of the invention as defined by the appended claims.

We claim:

1. A method of concealing errors in a composite PAL or NTSC digital television signal, which television signal comprises a plurality of sample signals corresponding respectively to sample positions along a horizontal scan line of a television picture made up of a plurality of said horizontal lines, the method comprising, in respect of each said sample signal:

using a first algorithm to calculate a first expected value of said sample signal, said first algorithm using actual values of adjacent sample signals in the same horizontal line as said sample signal for said calculation;

performing a first comparison between said first expected value and the actual value of said sample signal;

using a second algorithm to calculate a second expected value of said sample signal, said second algorithm using actual values of adjacent sample signals in the same horizontal line as said sample signal and actual values of adjacent sample signals in the horizontal lines preceding and following the horizontal line of said sample signal;

performing a second comparison between said second expected value and the actual value of said sample signal;

continuously storing an indication as to which of said first and second comparisons gives a result closer to zero; and on occurrence of an error sample signal substituting a corrected sample signal for said error sample signal so as to conceal the error, said corrected sample signal being generated using said first or second algorithm in dependence on said indication.

2. A method according to claim 1 wherein said first algorithm is represented as:

$$A1V(n, S) = \tfrac{1}{2}AV(n, S-2) + \tfrac{1}{2}AV(n, S+2)$$

where A1V(n, S) is said estimated sample value for the sample position S in the horizontal line n calculated using said first algorithm, and AV(n, S) is said actual value for the sample position S in the horizontal line n.

3. A method according to claim 2 wherein said second algorithm uses actual values of four sample signals adjacent to said sample signal in the same horizontal line as said sample signal and actual values of two sample signals adjacent to said sample signal in each of the horizontal lines immediately preceding and succeeding the horizontal line of said sample signal.

4. A method according to claim 2 wherein said television signal is a PAL signal, and wherein said second algorithm is represented as:

$$A2V(n, S) = \tfrac{1}{8}AV(n-1, S-\tfrac{1}{2}) + \tfrac{1}{8}AV(n-1, S+\tfrac{1}{2}) + \tfrac{1}{8}AV(n, S-2) - \tfrac{3}{8}AV(n, S-1) - \tfrac{3}{8}AV(n, S+1) + \tfrac{1}{8}AV(n, S+2) + \tfrac{1}{8}AV(n+1, S-\tfrac{1}{2}) + \tfrac{1}{8}AV(n+1, S+\tfrac{1}{2})$$

where A2V(n, S) is said estimated sample value for the sample position S in the horizontal line n calculated using said second algorithm, and AV(n, S) is said actual value for the sample position S in the horizontal line n.

5. A method according to claim 2 wherein said television signal is an NTSC signal, and wherein said second algorithm is represented as:

$$A'2V(n, S) = \tfrac{1}{8}AV(n-1, S-\tfrac{3}{4}) + \tfrac{3}{8}AV(n-1, S+\tfrac{1}{4}) + \tfrac{1}{8}AV(n, S-2) - \tfrac{3}{8}AV(n, S-1) - \tfrac{3}{8}AV(n, S+1) + \tfrac{1}{8}AV(n, S+2) + \tfrac{3}{8}AV(n+1, S-\tfrac{1}{4}) + \tfrac{1}{8}AV(n+1, S+\tfrac{3}{4})$$

where A'2V(n, S) is said estimated sample value for the sample position S in the horizontal line n calculated using said second algorithm, and AV(n, S) is said actual value for the sample position S in the horizontal line n.

6. A method according to claim 2 wherein said television signal is an NTSC signal, and wherein said second algorithm is represented as:

$$A''2V(n, S) = \tfrac{3}{8}AV(n-1, S-\tfrac{1}{4}) + \tfrac{1}{8}AV(n-1, S+\tfrac{3}{4}) + \tfrac{1}{8}AV(n, S-2) - \tfrac{3}{8}AV(n, S-1) - \tfrac{3}{8}AV(n, S+1) +$$

-continued
$$\tfrac{1}{8}AV(n, S+2) + \tfrac{3}{8}AV(n+1, S-\tfrac{1}{2}) + \tfrac{3}{8}AV(n+1, S+\tfrac{1}{2})$$

where $A''2V(n, S)$ is said estimated sample value for the sample position S in the horizontal line n calculated using said second algorithm, and $AV(n, S)$ is said actual value for the sample position S in the horizontal line n.

7. Apparatus for concealing errors in a composite PAL or NTSC digital television signal, which television signal comprises a plurality of sample signals corresponding respectively to sample positions along a horizontal scan line of a television picture made up of a plurality of said horizontal lines, the apparatus comprising:

means operative in respect of each said sample signal to use a first algorithm to calculate a first expected value of said sample signal, said first algorithm using actual values of adjacent sample signals in the same horizontal line as said sample signal for said calculation;

means for performing a first comparison between said first expected value and the actual value of said sample signal;

means operative in respect of each said sample value to use a second algorithm to calculate a second expected value of said sample signal, said second algorithm using actual values of adjacent sample signals in the same horizontal line as said sample signal and actual values of adjacent sample signals in the horizontal lines preceding and following the horizontal line of said sample signal;

means for performing a second comparison between said second expected value and the actual value of said sample signal;

means for continuously storing an indication as to which of said first and second comparisons gives a result closer to zero; and     means operative on occurrence of an error sample signal to substitute said corrected sample signal for said error sample signal so as to conceal the error, said said corrected sample signal being generated using said first or second algorithm in dependence on said indication.

* * * * *